United States Patent
Hardt et al.

(10) Patent No.: US 7,466,544 B2
(45) Date of Patent: Dec. 16, 2008

(54) LATCHING MECHANISM

(75) Inventors: Thomas T. Hardt, Missouri City, TX (US); Carlos Torres, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/019,745

(22) Filed: Jan. 25, 2008

(65) Prior Publication Data

US 2008/0117584 A1    May 22, 2008

Related U.S. Application Data

(62) Division of application No. 11/232,280, filed on Sep. 21, 2005, now Pat. No. 7,349,200.

(60) Provisional application No. 60/650,336, filed on Feb. 4, 2005.

(51) Int. Cl.
*G06F 1/16* (2006.01)
*G02B 6/36* (2006.01)

(52) U.S. Cl. .................. 361/686; 361/683; 361/727; 361/728; 361/732; 385/53; 385/88; 385/89; 385/92; 439/352; 439/607

(58) Field of Classification Search ............ 361/681, 361/683, 685, 724–728, 732, 754–756, 759, 361/798; 16/422, 429, 110.1, 438; 385/53, 385/86–92, 81, 62, 139, 134; 435/287, 399; 24/294, 366, 59, 458, 522, 532, 371, 539, 24/313, 540, 572; 439/160, 188, 352, 372, 439/607, 906, 476, 157, 266, 483; 292/162, 292/175, 153, 147, 197, 87, 89
See application file for complete search history.

(56) References Cited

U.S. PATENT DOCUMENTS

| | | | | |
|---|---|---|---|---|
| 6,430,053 | B1 * | 8/2002 | Peterson et al. | 361/728 |
| 6,439,918 | B1 * | 8/2002 | Togami et al. | 439/372 |
| 6,519,160 | B1 * | 2/2003 | Branch et al. | 361/754 |
| 6,749,448 | B2 * | 6/2004 | Bright et al. | 439/160 |
| 6,824,416 | B2 * | 11/2004 | Di Mascio | 439/352 |
| 6,851,867 | B2 * | 2/2005 | Pang et al. | 385/88 |
| 6,916,123 | B2 * | 7/2005 | Kruger et al. | 385/92 |
| 6,991,481 | B1 * | 1/2006 | Guan et al. | 439/160 |
| 7,008,253 | B2 * | 3/2006 | Szczesny | 439/352 |
| 7,049,911 | B2 * | 5/2006 | Germain et al. | 335/18 |
| 7,052,306 | B2 * | 5/2006 | Ishigami et al. | 439/372 |
| 7,281,862 | B2 * | 10/2007 | Oen et al. | 385/88 |
| 7,322,845 | B2 * | 1/2008 | Regnier et al. | 439/352 |

* cited by examiner

*Primary Examiner*—Michael V Datskovskiy

(57) ABSTRACT

A latch mechanism comprising a frame having an insertion axis therethrough. A first latch spring is disposed on the frame and is biased to an extended position. A handle is connected to the frame and is movable along the insertion axis between a first position and a second position. A first cam is disposed on the handle and moves the first latch spring to a retracted position as the handle moves toward the second position.

11 Claims, 5 Drawing Sheets

US 7,466,544 B2

LATCHING MECHANISM

CROSS-REFERENCE TO A RELATED APPLICATION

The present application claims the benefit of, and incorporates by reference, provisional application Ser. No. 60/650,336, filed Feb. 4, 2005, and entitled "Push/Pull Mechanism." This application is also a divisional application of application Ser. No. 11/232,280, filed Sep. 21, 2005 now U.S. Pat. No. 7,349,200, entitled "Latching Mechanism," which application is incorporated by reference herein as if reproduced in full below.

BACKGROUND

Many computer systems are constructed as a collection of components that are assembled together within a single chassis or cabinet. The components are often arranged such that individual components can be installed into and removed from the chassis as needed for maintenance and service. In order to facilitate use, the components are often equipped with a handle or some other feature for handling the component and enabling installation into the computer system.

Another feature often found in these computer systems are latching mechanisms that securely connect the component to the chassis. The latching mechanisms are generally used to prevent unintentional removal of the components. The latching systems often operate independently of any handling features that the component may have. Thus, in many instances the latching and handling systems require two distinct motions, such as rotating and pulling, to unlatch and remove a component from a chassis.

One restriction on the design of component handling and latching systems is the space available within a chassis. With the development of smaller computer systems, space within a chassis may become limited and less space may be available for latching and handling systems.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
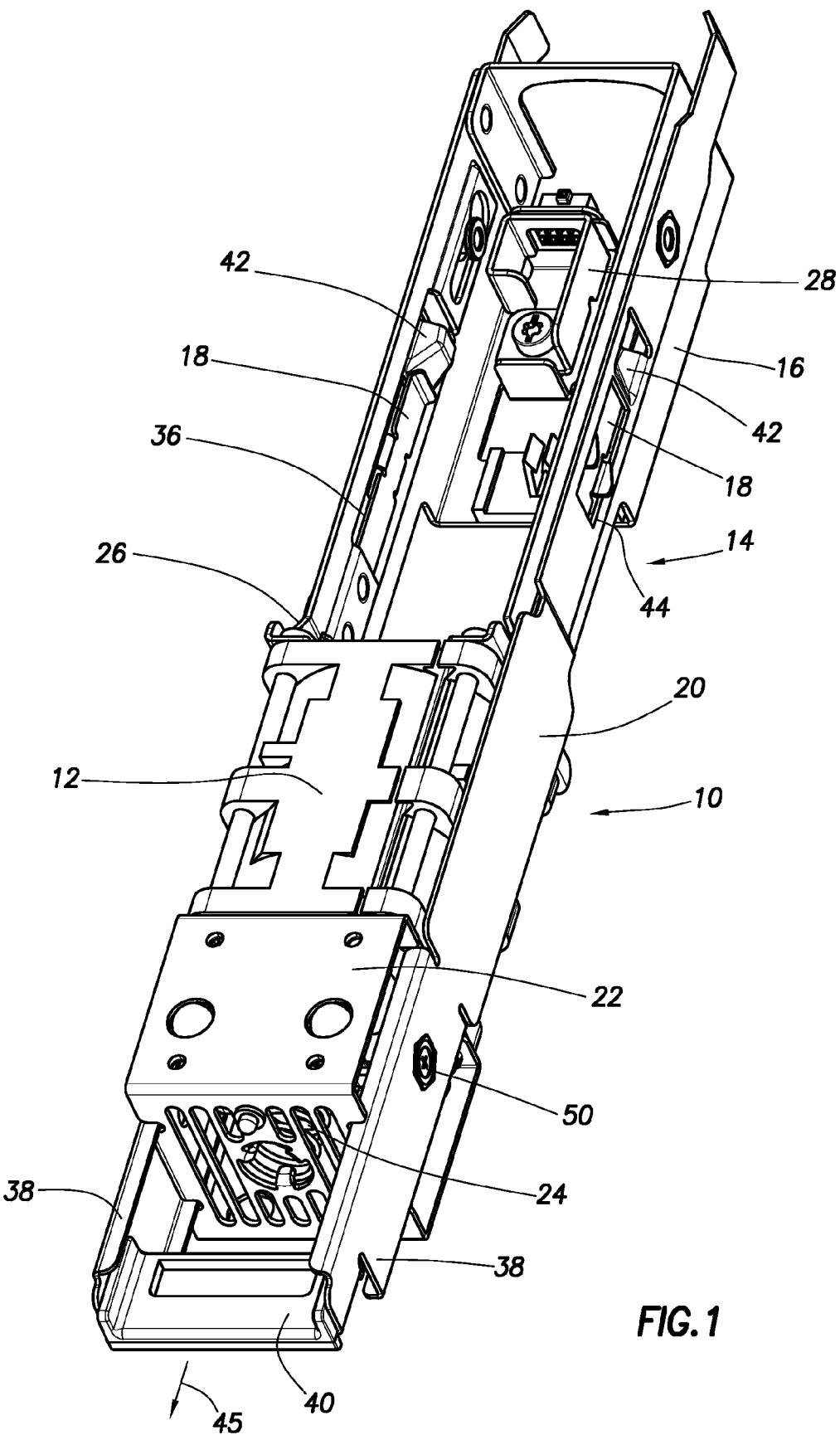
FIG. 1 shows an assembly comprising an embodiment of latch mechanism constructed in accordance with embodiments of the present invention.
Figure 2:
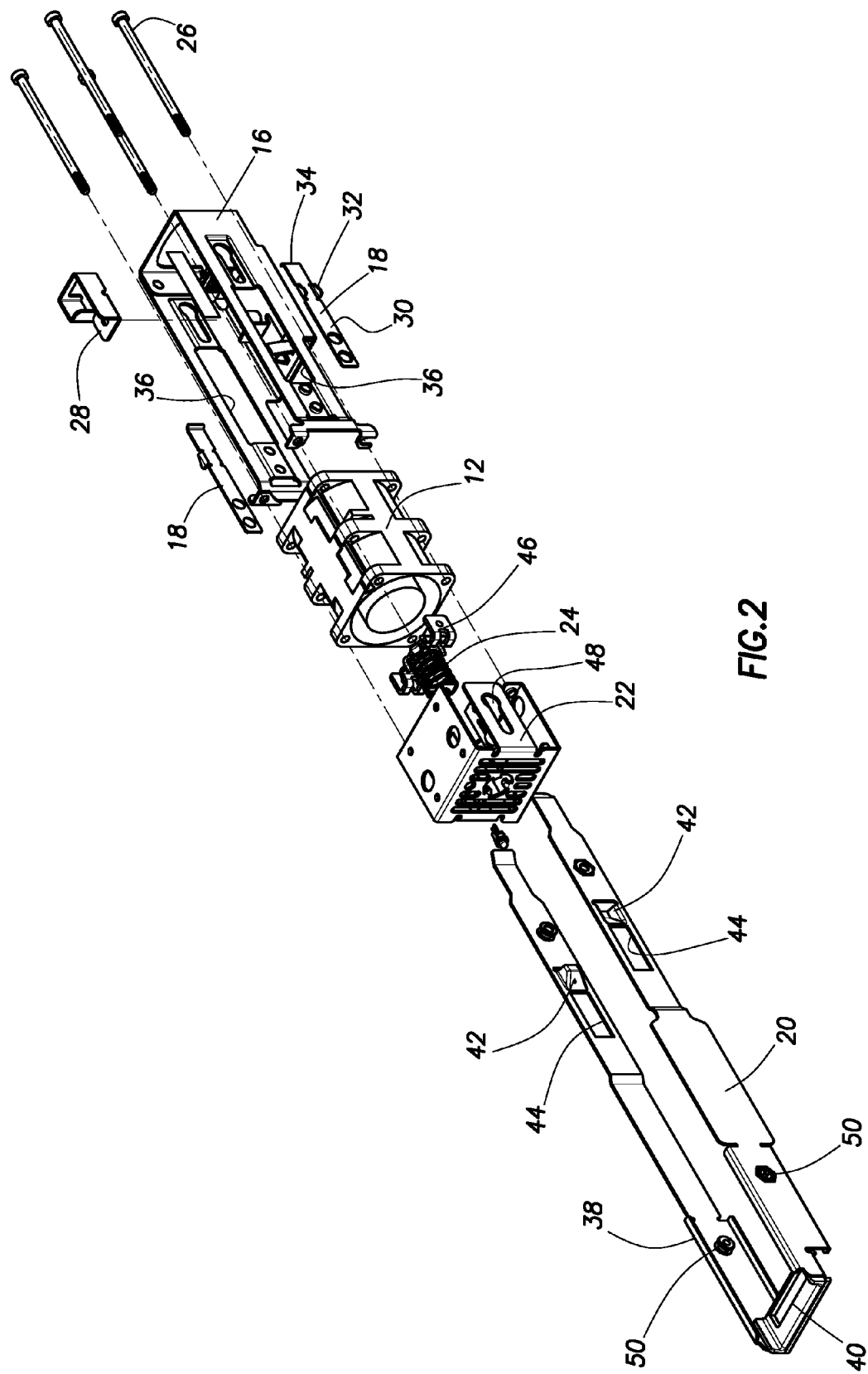
FIG. 2 shows an exploded view of the assembly of FIG. 1.

Referring now to FIGS. 1 and 2, removable assembly 10 comprises electronic component 12 and latch mechanism 14. Electronic component 12 is illustrated as a cooling fan but may be any electronic component used in a computer system, such as a power supply, disk drive, expansion card, or other device. Latch mechanism 14 comprises frame 16, latch springs 18, handle 20, spacer 22, and recoil spring 24. Assembly 10 is held together by screws 26. Assembly 10 also comprises connector mount 28 that is connected to frame 16 and supports a connector that is coupled to electronic component 12.

Latch springs 18 comprise body 30, engagement tabs 32, and angled face 34. Latch spring body 30 is disposed on frame 16 and extends into aperture 36 such that engagement tabs 32 project through the aperture. Latch springs 18 are constructed from sheet metal, plastic, or some other material that provides sufficient flexibility and resiliency so as to bias the latch spring to the position where engagement tabs 32 extend through aperture 36.

Handle 20 comprises substantially parallel members 38 connected by gripping portion 40. Each parallel member 38 comprises cam 42 and slot 44. Parallel members 38 extend from gripping portion 40 along the sides of frame 16. Handle 20 has a first position, see FIGS. 1 and 4, where cams 42 are disposed within apertures 36 on frame 16 and slots 44 are aligned with the apertures such that engagement tabs 32 of latch springs 18 extend through slots 44.

Spacer 22 is connected to electronic component 12 and houses recoil spring 24 and retainer 46. Retainer 46 extends through slot 48 in spacer 22 and engages lugs 50 on handle 20. Recoil spring 24 is thus retained between spacer 22 and handle 20 so as to bias the handle to the first position. Recoil spring 24 may be a coiled spring, flat spring, elastomeric member, or some other resilient member. Handle 20 also has a second position, see FIG. 7, wherein handle 20 is pulled in direction 45. As handle 20 is pulled to the second position, cams 42 engage angled face 34 so as to urge latch springs 18 inward and retract engagement tabs 32.

Figure 3:
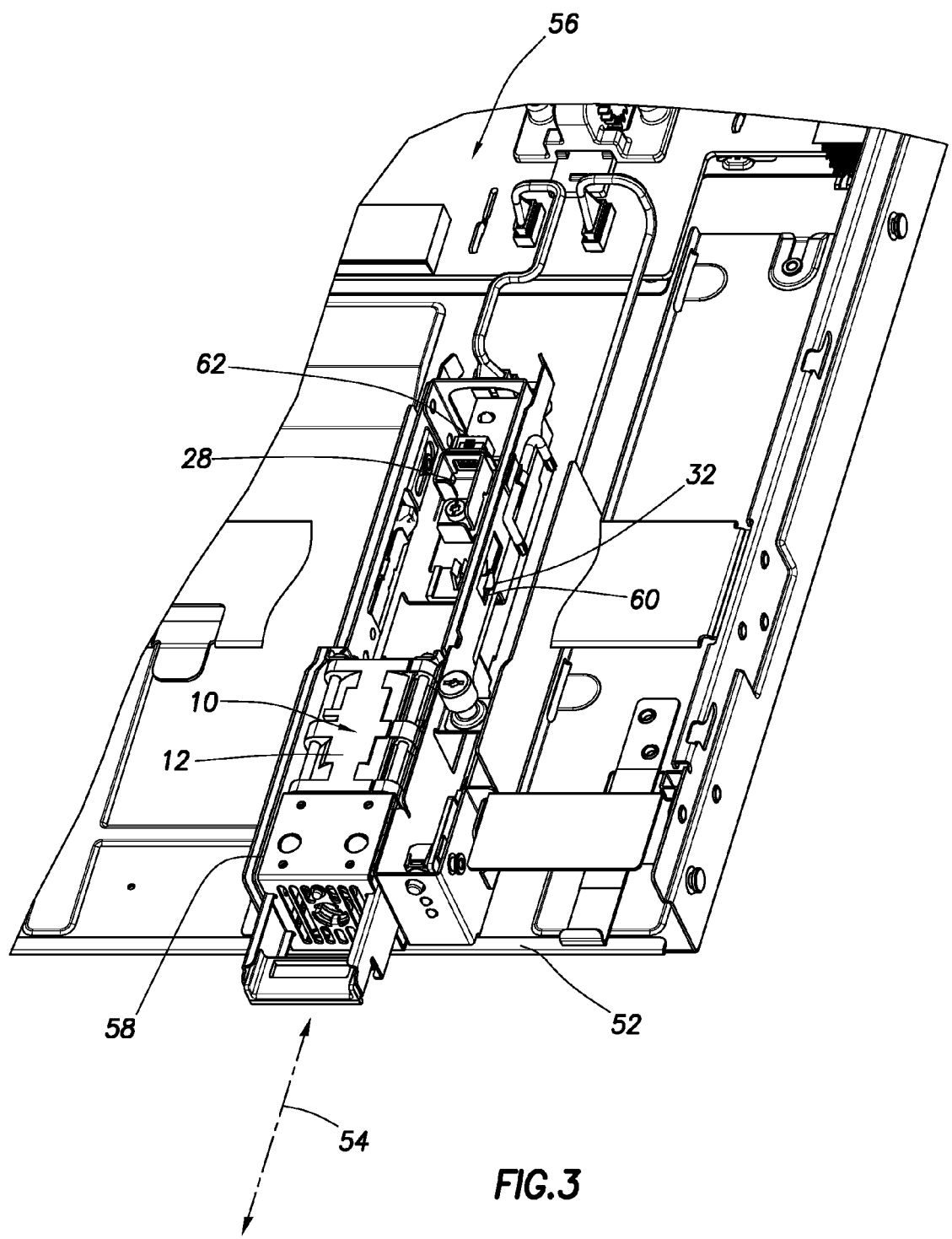
FIG. 3 shows a computer system including the assembly of FIG. 1.

Referring now to FIG. 3, assembly 10 is disposable in chassis 52 along insertion axis 54. Chassis 52 supports an electronic component 56, such as a motherboard, and comprises receptacle 58 that receives assembly 10. Receptacle 58 comprises tab receiver 60 and connector plug 62. When assembly 10 is fully inserted into chassis 52, engagement tabs 32 engage receiver 60 to retain the assembly within the chassis and connector plug 62 engages a connector on connector mount 28 to electrically couple electronic component 12 to electronic component 56. The position of latching mechanism 14 is shown in FIG. 6.

Figure 4:
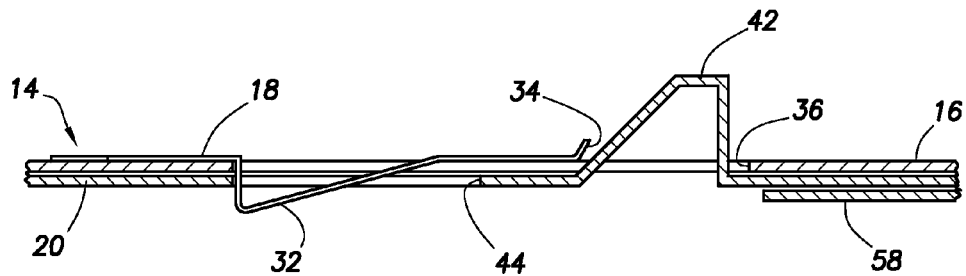
FIG. 4 shows a schematic representation of an embodiment of a latching mechanism disengaged from a receptacle.
Figure 5:
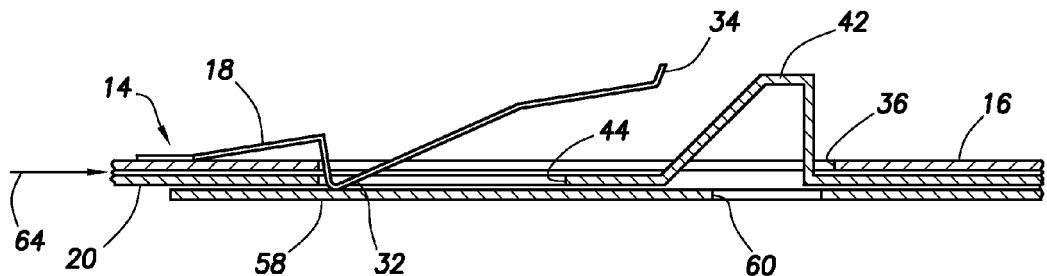
FIG. 5 shows a schematic of an embodiment of a latching mechanism being inserted into a receptacle.

The interface of a latching mechanism 14 and corresponding receptacle 58 is detailed in FIGS. 4-7. In FIG. 4, latching mechanism 14 is shown outside of receptacle 58. Handle 20 is in the first position where cams 42 are disposed within apertures 36 on frame 16 and slots 44 are aligned with the apertures such that engagement tabs 32 of latch springs 18 extend through slots 44. FIG. 5 illustrates the operation of latching mechanism 14 as it is slidably disposed within receptacle 58 in the direction indicated by arrow 64. As the wall of receptacle 58 contacts engagement tabs 32, latch spring 18 will deflect inward and allow assembly 10 to slide within receptacle 58.

Figure 6:
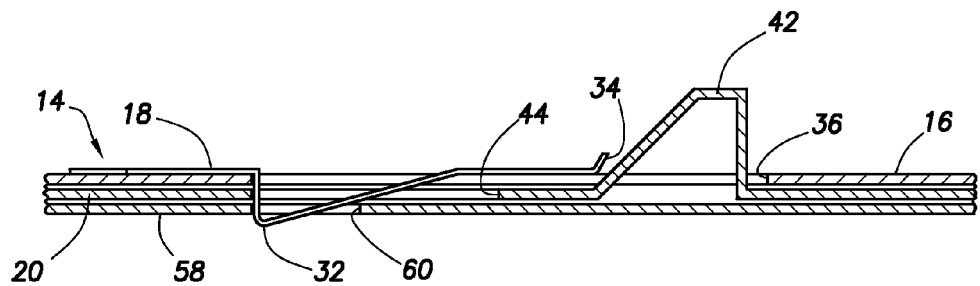
FIG. 6 shows a schematic representation of an embodiment of a latching mechanism engaged with a receptacle.

Once latching mechanism 14 is fully received within receptacle 58, as is shown in FIG. 6, latch spring 18 moves engagement tabs 32 outward where they engage tab receiver 60. The engagement of tabs 32 and receiver 60 prevents latching mechanism 14 from moving out of engagement with receptacle 58. In order to disengage latching mechanism 14 from receptacle 58, handle 20 is pulled along insertion axis 54 in the direction indicated by arrow 66. As handle 20 is pulled, cam 42 engages angled face 34 so as to urge latch spring 18 inward. The inward movement of latch spring 18 retracts engagement tab 32 from receiver 60 and allows assembly 10 to be pulled along insertion axis 54 in the direction indicated by arrow 66.

Figure 7:
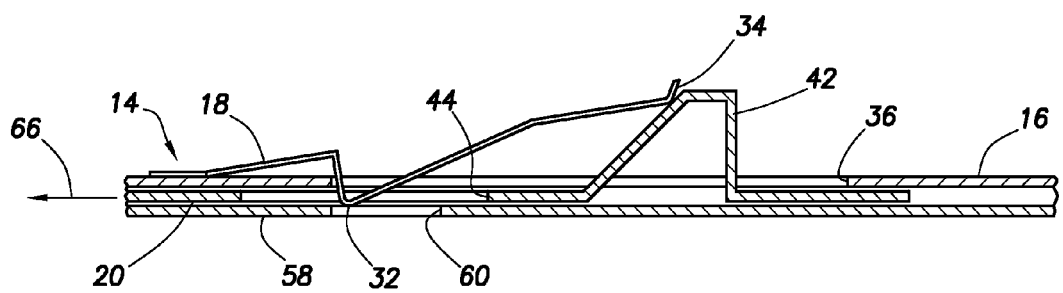
FIG. 7 shows a schematic representation of an embodiment of a latching mechanism being pulled out of a receptacle

Referring back to FIG. 3, the installation of component assembly 10 into chassis 52 is achieved by simply inserting the component assembly along insertion axis 54 into receptacle 58. The operation of latching mechanism 14 during this installation is shown in FIG. 5. As shown in FIG. 6, latching mechanism 14 will automatically engage receptacle 58 as assembly 10 is inserted into the receptacle. To remove component assembly 10 from chassis 52, the user only has to pull handle 20 to disengage latching mechanism as shown in FIG. 7. As handle 20 is pulled, latching mechanism 14 will disengage from receptacle 58 and assembly 10 will be pulled out of the receptacle. Once assembly 10 is removed from chassis 12, handle 20 is released and recoil spring 24 returns handle 20 to the first position.

The operation of latching mechanism is transparent to the user in that it operates without requiring manipulation separate from that which is already taking place, i.e., the pushing and pulling of the handle to move the component. The latching mechanism may be disengaged directly by pulling the handle, or may be otherwise disengaged as the component is pulled out of the receptacle. Latching mechanism 14 also provides a system that takes up very little space. The components of latching mechanism 14 can be constructed from a sheet metal, molded plastic, or some other relatively thin material such that the total thickness of the latching mechanism can be minimized. The overall thickness used by a latching mechanism can be further reduced by utilizing a single latch spring or other engagement member.

Latching mechanism 14 may be used with a variety of electronic components that are removable from a computer system chassis. For example, embodiments of the latching mechanism can be used with removable power supplies, disk drives, expansion cards, fans, processor modules. In certain embodiments, the latching mechanism could be used in securing a chassis within a rack or other enclosure. The latching mechanism may engage any number of features to retain the component within a receptacle of a chassis or rack, including slots, grooves, pins, posts, or other members that allow the latching mechanism to engage the receptacle as the component is inserted into the receptacle.

Figure 8:
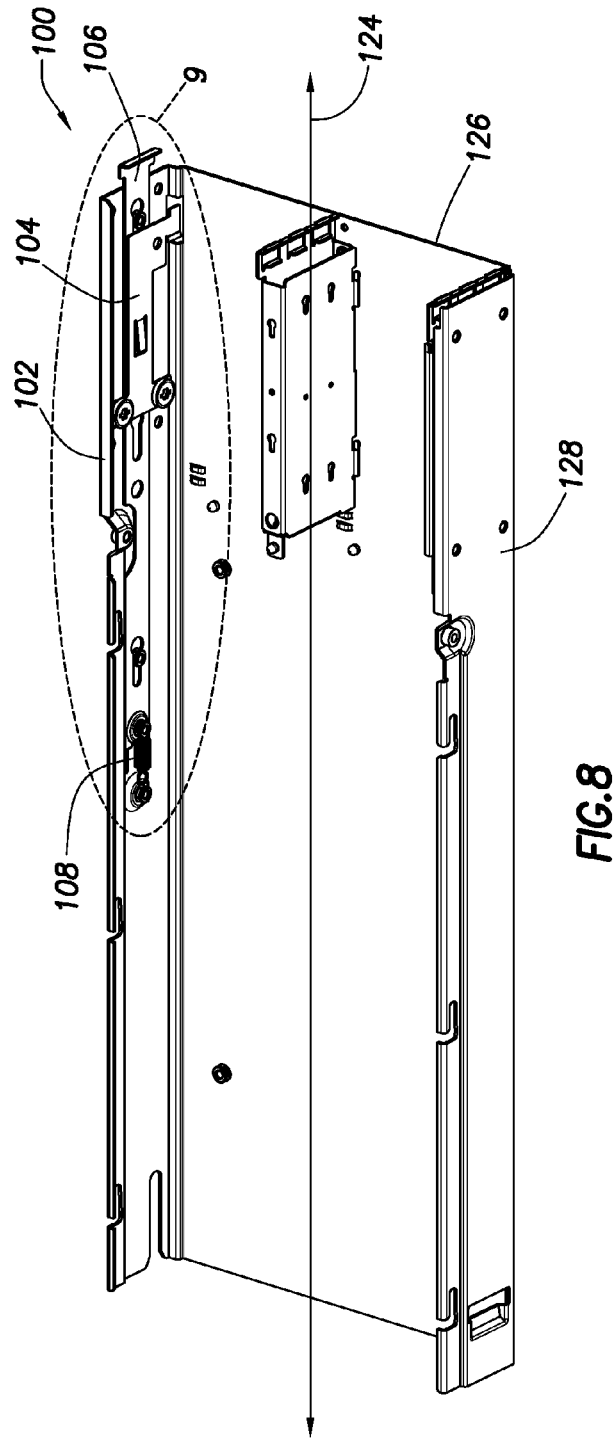
FIG. 8 shows a partial view of a latch mechanism constructed in accordance with embodiments of the present invention.
Figure 9:
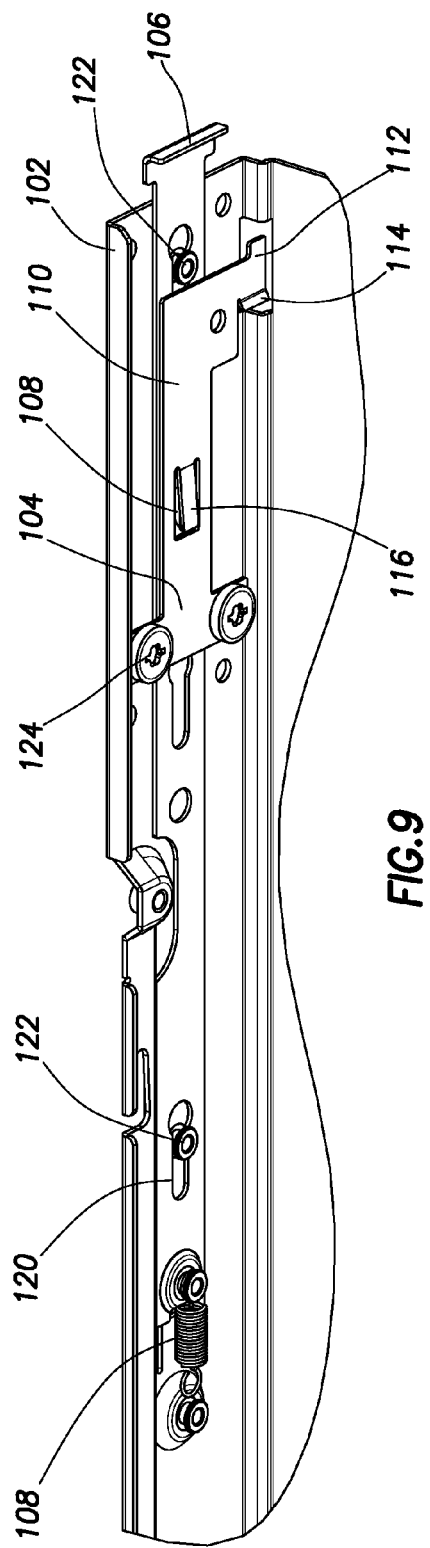
FIG. 9 shows a detail view of a portion of the latch mechanism of FIG. 8.

Referring now to FIGS. 8 and 9, latch mechanism 100 comprises frame 102, latch spring 104, handle 106, and recoil spring 108. Latch spring 104 is coupled to frame 102 by fasteners 124 and further comprises spring body 110, engagement tab 112, angled face 114, and cam surface 116. Handle 106 comprises cam 118 and is slidably coupled to frame 102 by slots 120 that are engaged with retainers 122. Recoil spring 108 is coupled to one end of handle 106.

Frame 102 is operable for insertion along insertion axis 124 into a chassis or other receptacle (not shown). As shown in FIGS. 8 and 9 frame 102 is integrated into the front side 126 of a rack-mountable chassis 128. As chassis 128 is inserted into a rack, angled face 114 of latch spring 104 will contact the rack and deflect latch spring 104 inward. Once fully inserted into the chassis, engagement tab 112 will align with a receptacle and latch spring 104 will move the engagement tab 112 into engagement with the receptacle and chassis 128 will be secured within the rack.

To remove chassis 128 from the rack, handle 106 is pulled outward. As handle 106 moves, cam 118 engages cam surface 116 and urges latch spring 104 inward until engagement tab 112 is disengaged from the receptacle on the chassis. Chassis 128 can then be removed from the rack. Once handle 106 is released, recoil spring 108 returns handle 106 to a retracted position where cam 118 is disengaged from cam surface 116.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
   a receptacle disposed within a chassis;
   a frame slidably insertable into said receptacle along an insertion axis;
   a first latch spring disposed on said frame and biased to a position engaged with said receptacle;
   a handle connected to said frame;
   a first cam disposed on said handle, wherein said first cam moves said first latch spring to a positioned disengaged from said receptacle as said handle is pulled along the insertion axis away from said receptacle; and
   a recoil spring operable to bias said handle to a position where said first latch spring can engage said receptacle.

2. The computer system of claim 1, further comprising:
   a first electronic component disposed within the chassis; and
   a second electronic component connected to said frame.

3. The computer system of claim 2, further comprising:
   a first connector coupled to said first electronic component and disposed within said receptacle; and
   a second connector coupled to said second electronic component and connected to said frame, wherein said first connector couples to said second connector as said frame is inserted into said receptacle.

4. The computer system of claim 1, further comprising:
a second latch spring disposed on said frame, wherein said second latch spring is biased to a position engaged with said receptacle; and
a second cam disposed on said handle, wherein said second cam moves said second latch spring to a positioned disengaged from said receptacle as said handle is pulled along the insertion axis away from said receptacle.

5. The computer system of claim 4, wherein said first latch spring and said second latch spring are disposed on opposite sides of said frame.

6. The computer system of claim 5, wherein said first cam is disposed on a first side of said handle and said second cam is disposed on a second side of said handle, wherein the first and second sides of said handle are connected by a gripping portion.

7. A computer system comprising:
a first electronic component disposed within a chassis;
a receptacle disposed within the chassis;
a second electronic component connected to a frame that is slidable relative to said receptacle along an insertion axis;
means for retaining the frame within said receptacle, wherein said means for retaining engages said receptacle as the frame is inserted into said receptacle along the insertion axis;
a handle connected to the frame, wherein said handle is movable along the insertion axis between a first position and a second position;
means for disengaging said means for retaining as said handle moves toward the second; and
means for biasing said handle to the first position.

8. The computer system of claim 7, further comprising means for coupling said second electronic component to said first electronic component.

9. The computer system of claim 8, wherein said means for coupling is engaged as the frame is inserted into said receptacle.

10. The computer system of claim 7, wherein said means for disengaging is connected to said handle.

11. The computer system of claim 7, wherein said means for retaining the frame within said receptacle engages two sides of said receptacle.

* * * * *

UNITED STATES PATENT AND TRADEMARK OFFICE
CERTIFICATE OF CORRECTION

| | | |
|---|---|---|
| PATENT NO. | : 7,466,544 B2 | Page 1 of 1 |
| APPLICATION NO. | : 12/019745 | |
| DATED | : December 16, 2008 | |
| INVENTOR(S) | : Thomas T. Hardt et al. | |

It is certified that error appears in the above-identified patent and that said Letters Patent is hereby corrected as shown below:

In column 6, line 9, in Claim 7, delete "second;" and insert -- second position; --, therefor.

Signed and Sealed this

Fourth Day of August, 2009

JOHN DOLL
*Acting Director of the United States Patent and Trademark Office*